United States Patent [19]

Pike

[11] Patent Number: 5,141,965
[45] Date of Patent: Aug. 25, 1992

[54] RESINS HAVING IMPROVED EXCHANGE KINETICS

[75] Inventor: William C. Pike, Midland, Mich.

[73] Assignee: The Dow Chemical Company, Midland, Mich.

[21] Appl. No.: 821,524

[22] Filed: Jan. 14, 1992

Related U.S. Application Data

[62] Division of Ser. No. 676,916, Mar. 28, 1991.

[51] Int. Cl.$^5$ .................. B01D 15/04; C08F 26/06
[52] U.S. Cl. .................. 521/32; 423/23; 423/24; 423/63; 423/138; 423/139; 423/DIG. 14; 521/25; 521/28; 521/29; 521/30
[58] Field of Search .................. 521/32, 25, 28, 29, 521/30

[56] References Cited

U.S. PATENT DOCUMENTS

| | | | |
|---|---|---|---|
| 2,597,492 | 5/1952 | Hwa | 521/32 |
| 2,597,493 | 5/1952 | Hwa | 521/32 |
| 2,632,000 | 3/1953 | McMaster | 521/32 |
| 2,632,001 | 3/1953 | McMaster | 521/32 |
| 2,642,417 | 6/1953 | Wheaton | 521/32 |
| 2,960,480 | 11/1960 | Thielen | 521/32 |
| 2,992,544 | 7/1961 | McMaster | 521/32 |
| 3,311,602 | 3/1967 | Small | 521/32 |
| 3,337,479 | 8/1967 | Small | 521/32 |
| 3,337,480 | 8/1967 | Small | 521/32 |
| 3,637,535 | 1/1972 | Corte | 521/32 |
| 4,031,038 | 6/1977 | Grinstead | 521/32 |
| 4,098,867 | 7/1978 | Grinstead | 521/32 |
| 4,224,415 | 9/1980 | Meitzner | 521/38 |
| 4,320,099 | 3/1982 | Babjak | 423/139 |
| 4,382,124 | 5/1983 | Meitzner | 521/38 |
| 4,419,245 | 12/1983 | Barrett | 210/681 |
| 4,564,644 | 1/1986 | Harris | 521/28 |
| 4,785,020 | 11/1988 | Boom | 521/32 |

FOREIGN PATENT DOCUMENTS 0361685 4/1990 European Pat. Off. .

OTHER PUBLICATIONS

R. M. Wheaton et al., "Ion Exchange," vol. 11, *Kirk-Othmer Ency. Chem. Tech.*, pp. 871-899 (2nd Ed., 1966).

F. Helfferich, *Ion Exchange*, pp. 47-58 (McGraw-Hill, 1962).

Calvin E. Schildknecht, *Polymer Processes*, Chapter III, Interscience Publishers, Inc., New York (1956).

*Primary Examiner*—Joseph L. Schofer
*Assistant Examiner*—Fred Zitomer
*Attorney, Agent, or Firm*—John L. Wood

[57] ABSTRACT

Disclosed are novel ion-exchange and chelate-exchange resins having improved exchange kinetics for separating chemical species from liquids. The resins are prepared from copolymer beads consisting of a monovinyl aromatic monomer and a cross-linking monomer. The copolymer beads are functionalized such that weak-base exchange moieties are substituted at haloalkylated sites which are most accessible to diffusion into the beads, while hydrophilic, strong-base exchange moieties are substituted at haloalkylated sites which are least accessible to diffusion. The resins have improved exchange kinetics due to shortened diffusion path lengths for the chemical species being separated and improved diffusion into the resin beads due to the hydrophilic, strong-base exchange moieties.

20 Claims, 2 Drawing Sheets

RESINS HAVING IMPROVED EXCHANGE KINETICS

CROSS-REFERENCE TO RELATED APPLICATION

This is a divisional of application Ser. No. 07/676,916, filed Mar. 28, 1991.

BACKGROUND OF THE INVENTION

This invention concerns ion-exchange and chelate-exchange resins and, in particular, novel resins functionalized so as to improve exchange kinetics. The invention also concerns a method of preparing the novel resins and a method for their use in separating chemical species from liquids.

Ion-exchange and chelate-exchange resins are widely employed by industry to separate chemical species from liquids which contain them in solution. These resins are commonly prepared by functionalizing a copolymer bead matrix with functional groups that can associate with chemical species, such as ions or molecules, when the resin is in contact with the liquid. Such resins are generally used in water treatment and purification, food preparation, pharmaceutical manufacturing, chemical processing, metal extraction, and so on, as is generally discussed by R. M. Wheaton et al. in, "Ion Exchange", Vol. 11 *Kirk-Othmer Ency. Chem. Tech.* pp. 871–899 (2nd Ed. 1966).

A disadvantage associated with such resins, and widely recognized within the art, is slow diffusion into the resin beads for the chemical species being separated. To attain the maximum operating capacity for the resin, it is necessary to use essentially all available exchange sites within the resin bead volume. To do so, substantially all of the available diffusion path length, i.e., the radius for a fully functionalized resin bead, must participate in exchange with the chemical species. Full utilization of the diffusion path length in this instance requires a relatively long time to reach exchange equilibrium. In contrast, resins having short diffusion path lengths reach exchange equilibrium more rapidly than resins having longer diffusion path lengths. A shorter diffusion path length therefore allows for more rapid access to available exchange sites and a quicker approach to exchange equilibrium. This shortened diffusion path ultimately leads to an ability to process relatively large amounts of feed streams without unduly sacrificing operating capacity.

Industry has previously made attempts to shorten the diffusion path length by reducing the size of resin beads. However, small beads lead to larger pressure drops across a resin bed and reduced flow rates for feed streams being processed. As such, substantially reducing the size of the resin beads is not practical for a commercial process.

Macroporous resins, such as those disclosed by Meitzner et al. in U.S. Pat. No. 4,224,415, were developed to improve kinetics by providing a highly porous copolymer bead matrix wherein relatively large pore sizes improve diffusion of chemical species into the interior portions of the beads. However, these resins also have a considerable amount of exchange sites which are relatively inaccessible to diffusion.

Many mining operations generate aqueous streams containing one or more heavy metals, like copper or nickel. Industry typically employs two methods to recover such metals, namely, solvent extraction or the use of chelate-exchange resins. Traditionally, solvent extraction has been used to recover such metals, but due to waste disposal considerations this method is gradually becoming obsolete. Accordingly, chelate-exchange resins are becoming important for these applications.

Improved exchange kinetics are particularly desirable for chelate-exchange resins, since diffusion of chemical species is often limiting with respect to the particular chelation reaction involved. For instance, U.S. Pat. Nos. 4,031,038 and 4,098,867 disclose chelate-exchange resins derived from aminopyridine compounds, such as 2-picolylamines. Although the resins are highly selective for metals like copper or nickel, they exhibit relatively slow exchange kinetics, i.e., the time required to reach equilibrium capacity for metal loading is fairly long. As such, a large amount of the resin is needed or only a portion of the available exchange capacity is used, to maintain a commercially reasonable feed rate for the liquid stream being processed. Further, partial use of the exchange capacity is an uneconomical use of the resin, since it is relatively expensive to produce.

Accordingly, it is desirable to develop resins which (1) exhibit improved exchange kinetics without undesirable increases in bed pressure drop, (2) allow for greater utilization of available exchange capacity, and (3) promote efficient loading and elution of the chemical species being separated. Such resins would result in a more economical and efficient separation process.

SUMMARY OF THE INVENTION

The above objects and advantages are obtained, in one aspect, by a resin having improved exchange kinetics. The resin comprises cross-linked copolymer beads having weak-base exchange moieties substituted at haloalkylated sites which are most accessible to diffusion and hydrophilic, strong-base exchange moieties substituted at haloalkylated sites which are least accessible to diffusion.

Another aspect of the present invention is a process for preparing the resin described in the preceding paragraph. The process comprises the steps of:

(a) contacting haloalkylated, cross-linked copolymer beads with a first aminating agent under conditions and for a time sufficient to substitute at least a portion of the haloalkylated sites with the weak-base exchange moieties, the substitution being conducted at a reaction rate which is greater than the rate at which the first aminating agent diffuses into the copolymer beads: and (b) contacting the partially functionalized copolymer beads with a tertiary amine under conditions and for a time sufficient to functionalize at least a portion of remaining haloalkylated sites with the strong-base exchange moieties.

Another aspect of the invention is a process having improved exchange kinetics for separating chemical species from a liquid which contains the chemical species in solution. The process comprises:

(a) contacting the liquid with a resin such that the chemical species are retained thereby, the resin comprising a plurality of cross-linked copolymer beads having weak-base exchange moieties substituted at haloalkylated sites which are most accessible to diffusion and hydrophilic, strong-base exchange moieties substituted at haloalkylated sites which are least accessible to diffusion; and (b) eluting the retained chemical species from the resin with a regenerating agent.

DETAILED DESCRIPTION OF THE INVENTION

Figure 1:
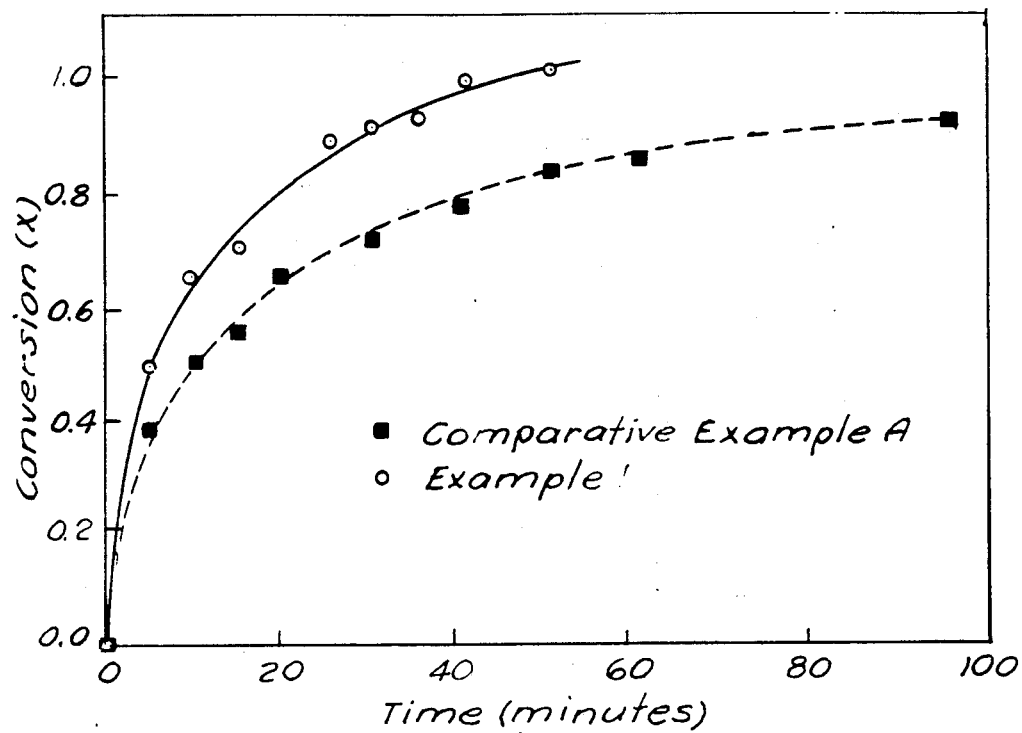
FIG. 1 is a graph of conversion versus time for results discussed in connection with Example 1 and Comparative Example A.

The resins disclosed are prepared by functionalizing copolymer beads, in a novel way, so as to improve diffusion of chemical species into the resin. During functionalization, weak-base exchange moieties are substituted onto the copolymer at haloalkylated sites which are most accessible to diffusion, while strong-base exchange moieties are substituted at haloalkylated sites which are least accessible to diffusion. The strong-base exchange moieties are more hydrophilic when compared to the weak-base exchange moieties, which increases the water retention capacity of the resin and improves diffusion of chemical species into the resin. The improved diffusion promotes increased exchange kinetics.

Partial functionalization with weak-base exchange moieties is preferably achieved by contacting haloalkylated copolymer beads with a first aminating agent. Contact is conducted under conditions such that the particular functionalization reaction proceeds at a rate which is more rapid in comparison to the rate of diffusion for the first aminating agent into the copolymer beads. In other words, the diffusion rate is the limiting rate for the functionalization reaction. Thus, as the first aminating agent diffuses into the bead, it reacts more readily with haloalkylated sites located near the outer surfaces of the bead prior to diffusing further therein.

Due to the nearly quantitative nature of amination reactions, partial functionalization is preferably achieved by reacting the haloalkylated copolymer beads with a sub-stoichiometric amount of the first aminating agent, which leaves unreacted those haloalkylated sites which are least accessible to diffusion. The resulting partially aminated resin beads may then be aminated with a tertiary amine so as to substitute at least a portion of the remaining haloalkylated sites with strong-base exchange moieties. Preferably, substantially all remaining haloalkylated sites are substituted with the strong-base exchange moieties.

An equivalent method would be to partially haloalkylate the copolymer beads in a manner such that the rate of haloalkylation is more rapid in comparison to the rate of diffusion for haloalkylating agents into the beads. In such a method, haloalkylated sites are substituted at sites on the copolymer which are most accessible to diffusion by the haloalkylation reagents. Upon amination with the first aminating agent, weak-base exchange moieties are formed at such sites. Thereafter, any remaining haloalkyl moieties may be reacted with a tertiary amine to form the strong-base exchange moieties, or the partially aminated beads may be further haloalkylated and the resulting haloalkyl sites converted to strong-base exchange moieties.

Accordingly, suitable functionalization methods are those wherein the rate of diffusion for weak-base functionalizing reagents into the beads is limiting with respect to the particular functionalization reaction involved. Other methods will become evident to those skilled in the art in view of the disclosure herein.

The resins of the present invention are prepared by generally following conventional methods, except that it is important to functionalize the copolymer beads as previously described. Numerous weak- and strong-base anion-exchange resins and methods for making them are generally described in U.S. Pat. Nos. 2,642,417; 2,960,480; 2,597,492; 2,597,493; 3,311,602; 2,632,000; 2,632,001 and 2,992,544, as well as by F. Helfferich in *Ion Exchange*, (McGraw-Hill 1962) at pps. 47-58, the relevant teachings of which are incorporated herein by reference.

In general, the resins are prepared by functionalizing a copolymer bead matrix. The copolymer beads are normally prepared by suspension polymerization of a mixture which includes a monovinyl aromatic monomer like styrene, a cross-linking monomer such as divinylbenzene, and an effective amount of a free-radical polymerization initiator. Thereafter, the copolymer bead matrix is typically haloalkylated by reaction with a haloalkylation agent, typically chloromethylmethylether, in the presence of a Friedel-Crafts catalyst. After haloalkylation, the beads are partially aminated with the first aminating agent, as defined hereinafter, to form the weak-base exchange moieties. Thereafter, the beads are further aminated with a tertiary amine to form the strong-base exchange moieties.

Suspension polymerization methods are well-known in the art. Suitable methods include, for example, a single-stage polymerization process as described by F. Helfferich in *Ion Exchange, supra,* at pages 35-36, wherein a single monomer mixture is suspension polymerized to produce copolymer beads. Also suitable is a "seeded" or multi-staged polymerization process described, for example, in U.S. Pat. Nos. 4,419,245 and 4,564,644, the teachings of which are incorporated herein by reference.

The monomers employed are addition polymerizable monovinyl aromatic compounds and any addition polymerizable polyvinyl compound which may act as a cross-linking monomer. Such monomers are well-known in the art and reference is made to *Polymer Processes,* edited by Calvin E. Schildknecht, published in 1956 by Interscience Publishers, Inc., New York, Chapter III, the relevant teachings of which are incorporated by reference. Of particular interest are water-insoluble monomers including monovinyl aromatics such as styrene, vinyl naphthalene, alkyl-substituted styrenes (particularly monoalkyl-substituted styrenes such as vinyltoluene and ethylvinylbenzene) and halo-substituted styrenes such as bromostyrene, chlorostyrene, or vinylbenzylchloride, the polyvinyl aromatics such as divinylbenzene, divinyltoluene, divinylxylene, divinylnaphthalene, trivinylbenzene, divinyldiphenyl ether, and divinyldiphenylsulfone; and mixtures of one or more of the monomers. Preferred monomers include monovinyl aromatics like styrene, or a mixture of styrene with a monoalkyl- or halo-substituted styrene derivative, and polyvinyl aromatics like divinylbenzene. The most preferred monomers are styrene and divinylbenzene.

Copolymer beads are advantageously prepared from monomer mixtures having from about 50 to about 99.9 weight percent, based on the weight of monomers employed, of the monovinyl aromatic monomer with the balance of the mixture, i.e., from about 0.1 to about 50 weight percent, being a cross-linking monomer. Preferred copolymer beads have from about 80 to about 99 weight percent of the monovinyl aromatic monomer with from about 1 to about 20 weight percent being the cross-linking monomer.

A liquid diluent which is substantially inert under polymerization conditions may be incorporated into the monomer mixture to obtain macroporous copolymer beads. Suitable diluents, as known to those in the art, are organic liquids which are a solvent for the monomers employed, but a non-solvent for the resulting copolymer.

The term "macroporous" (also referred to as macroreticular) is widely used in the art and, in general, refers to copolymer beads which have regions of densely packed polymer chains exhibiting molecular-sized porosity which are separated by copolymer-free voids, often referred to as mesopores (50–200 Å) and macropores (>200 Å). In contrast, microporous, or gel-type, resins have pores generally of molecular-size (generally less than about 50Å). Macroporous and gel resins are further described in U.S. Pat. Nos. 4,224,415 and 4,382,124, the teachings of which are incorporated herein by reference. Copolymer beads employed herein may be either macroporous or gel.

Methods for haloalkylating copolymer beads are well-known. Illustrative of such are U.S. Pat. Nos. 2,642,417; 2,960,480; 2,597,492; 2,597,493; 3,311,602; 2,632,000; 2,632,001 and 2,992,544 and Helfferich, supra, at pages 52–53, all of which have been incorporated herein by reference. In general, the copolymer beads are preferably haloalkylated by swelling them with a haloalkylating agent and an effective amount of a Friedel-Crafts catalyst. Thereafter, the swollen copolymer beads are heated to a temperature sufficient to initiate reaction and the temperature is maintained until obtaining a desired degree of reaction. The copolymer beads are preferably halomethylated and most preferably chloromethylated. Haloalkylated copolymer beads may also be obtained by copolymerizing monomers like vinylbenzylchloride with a cross-linking monomer.

Weak-base exchange moieties are attached to the haloalkylated copolymer beads by generally following methods discussed, for example, in the patents identified in the preceding paragraph and by F. Helfferich in his book, supra, at pages 53–58. In general, weak-base exchange moieties may be attached by heating haloalkylated copolymer beads in the presence of a first aminating agent, as such compounds are described hereinafter.

Suitable first aminating agents are primary and secondary amines capable of reacting with the haloalkylated sites on the copolymer to form weak-base exchange moieties which are less hydrophilic relative to the strong-base exchange moieties. First aminating agents desirably correspond to the formula:

$$HNR^1R^2$$

wherein:
$R^1$ is selected from hydrogen and aliphatic or aromatic groups having up to about 16 carbon atoms; and
$R^2$ is selected from aliphatic or aromatic groups having up to about 16 carbon atoms.

Aliphatic groups preferably have from 1 to about 8 carbon atoms, and more preferably from about 2 to about 6 carbon atoms. Examples of preferred aliphatic groups are alkyls like methyl, ethyl, propyl, or butyl and hydroxyalkyls like methoxy, ethoxy, propoxy, and butoxy.

An aromatic group comprises either a single aromatic ring or a fused aromatic ring system, such as in the case of a naphthalene ring. An aromatic group optionally has an intermediate bridging moiety, for example a —CH$_2$— moiety, which connects the nitrogen atom of the first aminating agent with the aromatic ring or ring system. The aromatic ring or ring system may be carbocyclic or heterocyclic in nature and, if heterocyclic, the hetero atom is preferably nitrogen. Aromatic groups preferably have no more than about 8 carbon atoms. Examples of preferred aromatic rings are benzene or pyridine rings.

Examples of suitable first aminating agents are dimethylamine, diethylamine, dipropylamine, dibutylamine, methylamine, ethylamine, propylamine, butylamine, benzylamine, methylbenzylamine, N,N-dibenzylamine, aniline, methylaniline, or the aminopyridine compounds discussed hereinafter.

Specifically contemplated herein are novel chelate-exchange resins derived, in part, from aminopyridine compounds. Preparation of fully functionalized resins with such aminopyridine compounds is disclosed in U.S. Pat. Nos. 4,031,038 and 4,098,867, the teachings of which are incorporated herein by reference. According to the present invention, the chelate-exchange resins have weak-base exchange moieties which correspond to the formula:

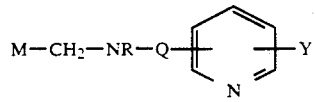

wherein:
M is the copolymer bead matrix;
Y is hydrogen or a C$_{1-4}$ alkyl;
Q is:
  (1) —CH$_2$—;
  (2) —(C$_2$H$_3$R'NR')$_x$—CH$_2$— where each R' is hydrogen or methyl, and x is 1 or 2; or
  (3) —NH— or —C$_2$H$_4$—; and
R is:
  (1) hydrogen, a C$_{1-4}$ alkyl, or C$_{2-4}$ hydroxyalkyl; and when Q is —CH$_2$—, R can also be:
  (2) allyl, benzyl, or o-hydroxybenzyl;
  (3)

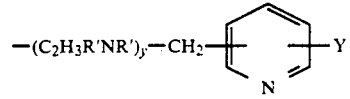

wherein each R' is hydrogen or methyl, and y is 0 or 1;
  (4) —(CH$_2$)$_m$OY where m is 2 or 3;
  (5) —C$_2$H$_3$R'NR$^3$R$^4$ where R' is hydrogen or methyl; R$^3$ is hydrogen, a C$_{1-4}$ alkyl, a C$_{2-4}$ hydroxyalkyl, phenyl, or benzyl; and R$^4$ is hydrogen, a C$_{1-4}$ alkyl, or a C$_{2-4}$ hydroxyalkyl;
  (6) —C$_2$H$_4$SR" where R" is a C$_{1-4}$ alkyl;
  (7) —C$_n$H$_{2n}$COOY where n is 1 or 2;
  (8) —C$_n$H$_{2n}$SO$_3$— where n is 1 or 2; or
  (9) CH$_2$Z where Z is —CONH$_2$ or —NHCONH$_2$.

Preferred resins have chelate-exchange moieties which are derived from 2-picolylamines. In such resins, the chelate-exchange moieties preferably correspond to the formula:

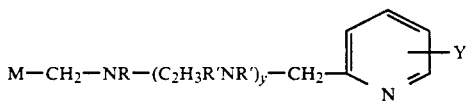

wherein M, R, R', y, and Y are as previously defined. Examples of preferred 2-picolylamines are 2-picolylamine, N-methyl-2-picolylamine, N-(2-hydroxyethyl)-2-picolylamine, N-(2-hydroxypropyl)-2-picolylamine, and bis-(2-picolyl)amine.

The copolymer beads are functionalized such that from about 15 to about 95 percent of haloalkylated sites are functionalized with the weak-base exchange moieties. A degree of functionalization below about 15 percent of available haloalkylated sites is undesired, because any increase in exchange kinetics is offset by limited weak-base exchange capacity. Above about 95 percent of available haloalkylated sites, the improvement in exchange kinetics is relatively small. Preferably from about 25 to about 90 percent, more preferably from about 45 to about 85 percent, and most preferably from about 50 to about 75 percent of available haloalkylated sites are functionalized with such moieties.

A swelling agent for the haloalkylated copolymer beads is not employed during amination with the first aminating agent, as such swelling agents tend to promote relatively uniform amination of the beads. It is important, as previously discussed, to functionalize the beads in a manner such that only those haloalkylated sites most accessible to diffusion are functionalized with the weak-base exchange moieties. Accordingly, it is preferred to conduct amination with the first aminating agent in a liquid medium which is substantially incapable of swelling the haloalkylated copolymer beads, but miscible with the first aminating reagent. Liquids which may be employed for this purpose are polar liquids which do not react with the haloalkylated copolymer beads or the first aminating agent. Examples of suitable polar liquids are water, $C_{1-4}$ alcohols, or mixtures thereof. Water is a preferred liquid medium.

Where the liquid medium is water, it preferably includes at least one soluble salt which promotes functionalization of haloalkylated sites which are most accessible to diffusion. Many first aminating agents are highly soluble in water and do not readily diffuse into the haloalkylated copolymer beads. Addition of a soluble salt to the liquid medium reduces the solubility of the first aminating agents in water and promotes their diffusion into the beads. Examples of suitable soluble salts are alkali metal halides and alkali metal sulfates. A preferred salt is sodium chloride due to relatively low cost. The amount employed will vary depending upon the choice of soluble salt. Generally, an adequate amount of soluble salt is from about 100 grams per liter (g/l) up to saturation for the particular salt employed. For sodium chloride, an amount of from about 150 to about 280 g/l (a saturated solution) is preferred.

Contact between the haloalkylated copolymer beads and the first aminating agent occurs under conditions sufficient to react the first aminating agent with the beads. Amination is preferably conducted at a temperature of from about 60° C. to about 100° C., and more preferably from about 70° C. to about 90° C. for at least about 2 hours. A base, such as sodium hydroxide or sodium carbonate, is typically added with the first aminating agent to minimize side reactions, a technique which is known in the art.

After amination with the first aminating agent, the resulting partially aminated resin beads are further aminated with a tertiary amine to provide hydrophilic, strong-base exchange moieties. Suitable tertiary amines include, for example, trimethylamine, triethylamine, tripropylamine, tributylamine, dimethylethylamine, dimethylisopropanolamine, ethylmethylpropylamine, dimethylaminoethanol, diethylmethylamine, and dimethylethanolamine. A preferred tertiary amine is trimethylamine, due to relatively low cost, good availability, and a small molecular size that allows for good penetration into the partially aminated resin beads.

Amination with the tertiary amine is achieved by contact with the partially aminated resin beads under conditions sufficient to react the remaining haloalkylated sites, i.e., those sites which are least accessible to diffusion into the copolymer beads. The tertiary amine is suitably present in an amount sufficient to functionalize at least a portion of, and preferably substantially all, remaining available haloalkylated sites. The conditions include a temperature of from about 20 to about 60° C. for least about 2 hours. Other conditions are well-known in the art.

After amination, the resulting resin may be converted to its free-base form by contact with a dilute, i.e., from about 0.5N to about 3N, aqueous base such as an alkali metal hydroxide solution. A preferred base is a dilute aqueous sodium hydroxide solution.

In the case of gel copolymer beads, the weak-base exchange moieties are substituted at haloalkylated sites located substantially within a continuous shell surrounding a central core that is substituted with the strong-base exchange moieties. Such "core-shell" functionalization occurs due to the slow diffusion of the first aminating agent into the bead relative to the rate of reaction for such agents with the haloalkylated copolymer beads. Thus, the core is least accessible to diffusion by the first aminating agents used to form the weak-base exchange moieties.

Core-shell functionalization, in a strict sense, is not believed to be achieved in the case of haloalkylated, macroporous copolymer beads, since the greater porosity of such beads allows for some diffusion of the first aminating agent into interior portions thereof. However, a core-shell distribution of exchange moieties which is less defined is believed to occur in these beads. At any rate, similar kinetic advantages are realized by functionalizing macroporous beads such that haloalkylated sites most accessible to diffusion are substituted with the weak-base exchange moieties, while haloalkylated sites least accessible to diffusion are substituted with the strong-base exchange moieties.

The resin suitably exhibits a water retention capacity of from about 30 percent to about 60 percent while in the free-base form. Water retention capacity is determined by swelling a weighed amount of resin with water, removing excess water and then weighing the fully swollen resin. The resin is then dried on a moisture balance until a constant weight is obtained. Water retention capacity is the ratio of water imbibed to the total combined weight of the resin plus imbibed water. Water retention capacity, on a substantially fully functionalized basis, is advantageously at least about 30 percent.

Preferred resins have a water retention capacity of at least about 35 percent, more preferably at least about 40 percent and most preferably from about 45 to about 55 percent. As used hereinafter, water retention capacity is measured while the resin is in the free-base form, unless specified otherwise.

The resins preferably have a wet volume capacity of at least about 0.7 meq/ml, more preferably at least about 0.8 meq/ml, and most preferably at least about 0.9 meq/ml. Of this capacity, weak-base exchange moieties contribute suitably from about 15 to 95 percent thereof, as previously described. Wet volume capacity may be determined by analytical techniques known in the art.

Resin particle size is not critical to obtain the benefits previously described herein. For most commercial applications, the resin preferably has a volume average particle diameter from about 100 to about 1,500, more preferably from about 150 to about 700, and most preferably from about 200 to about 600 micrometers ($\mu m$). Volume average particle diameter may be determined by any one of a number of commercially available instruments designed to make such measurements, such as a Criterion Model PC-320 Particle Size Analyzer available from the HIAC-Royco Company.

In the process of using the novel resins disclosed herein, chemical species are separated from liquids by contact with the resin. The process is characterized by exchange kinetics which are improved in comparison to resins functionalized only with the weak-base exchange moieties. The term "exchange kinetics" as used herein refers to the rate at which chemical species are retained by the resin.

Suitable methods for conducting the separation are those resulting in intimate contact between the liquid and the resin. Examples of suitable methods include fluidized beds, stirred tanks, batch tanks, and cocurrent or countercurrent flow columns. The contact may occur batchwise, semi-batchwise, continuously, or semi-continuously. Preferably, the liquid is contacted with the resin in a continuous system employing a packed ion-exchange column.

The time required for contact will depend upon numerous factors, such as the following: (1) the properties of the resin employed; (2) the amount of chemical species present in the liquid mixture; (3) the degree of separation desired; and (4) the amount of resin employed in the process. Thus, the time employed in most instances is more or less determined empirically. Generally, a bed residence time of from about 0.1 hours (10 bed volumes/hr) to about 10 hours (0.1 bed volume/hr), more preferably about 0.12 hours (8 bed volumes/hr) to about 1 hour (1 bed volume/hr), and most preferably about 0.17 hours (6 bed volumes/hr) to about 0.5 hours (2 bed volumes/hr), yields acceptable results in a column operation. The term "bed volume" refers to a volume of the liquid mixture being treated which is equal to the volume of the resin employed in a resin bed.

The temperature at which the contact is conducted is one which does not adversely affect either the resin or the liquid being treated. In general, the temperature is limited only by the freezing point, boiling point, and viscosity of the liquid, as well as the temperature at which the components of the liquid or the resin itself begins to decompose. In general, temperatures from about 20° C. to about 100° C. are suitable.

The chelate-exchange resins of the present invention, as previously described, are particularly useful for recovery of heavy metal ions dissolved in liquids, such as mine leachate solutions. Heavy metal ions of interest are copper, nickel, iron, cobalt, silver, gold, mercury, platinum, vanadium, molybdenum, chromium, or cadmium, with copper and nickel being preferred metals. The liquid suitably has a pH of from about 1 to about 5, with the concentration of heavy metal ions being from about 0.1 to about 10 g/l.

If desired, chemical species retained by the resin may be recovered by elution with a suitable regenerant. The regenerant employed and amount required will depend upon the particular resin and chemical species involved, as those skilled in the art can appreciate. Where heavy metals are retained by the chelate resins previously described, suitable regenerants are aqueous solutions of strong inorganic acids and ammonium hydroxide. Preferred regenerants are sulfuric acid and ammonium hydroxide.

The concentration of the inorganic acid is important to obtain a reasonably quick elution of retained heavy metal ions. Generally, a concentration of from about 0.1N to about 5N provides a reasonably sharp and quick elution. Below about 0.1N, the retained heavy metal ions are not as easily eluted from the resin and the elution is not as sharply defined. Concentration is not as important for the ammonium hydroxide solution. An ammonium hydroxide concentration of from about 0.001N to about 15N is adequate.

The eluate obtained will generally have a greater concentration of the chemical species, such as the heavy metal ions, in comparison with the liquid being treated. Where heavy metal ions are in the eluate, they may be further recovered by conventional methods, such as electrowinning, crystallization, precipitation, or cementation.

SPECIFIC EMBODIMENTS OF THE INVENTION

The following examples illustrate the present invention and should not be construed, by implication or otherwise, as limiting the scope of the appended claims. All parts and percentages are by weight and all temperatures in degrees Celsius (°C.) unless indicated otherwise.

EXAMPLE 1

This example concerns preparation of a chelate-exchange resin and evaluation of its exchange kinetics with respect to removing copper ions from an acidified, aqueous solution.

Macroporous copolymer beads are prepared by polymerizing styrene, a commercially available divinylbenzene mixture, and 2,2,4-trimethylpentane as a liquid diluent, in a single-stage suspension polymerization described in U.S. Pat. No. 3,637,535. The diluent is employed in an amount sufficient to yield an organic phase having 42 weight percent diluent, based upon the weight of the monomers and diluent. The commercially available divinylbenzene mixture is obtained from The Dow Chemical Company and consists of 55 weight percent divinylbenzene, with the balance of the mixture being essentially ethylvinylbenzene. The resulting macroporous copolymer beads have 6 weight percent divinylbenzene, based on total weight of the monomers employed and have a volume average diameter of 460 $\mu m$.

The copolymer beads are chloromethylated by first adding 100 grams of the beads and 500 grams of chloromethylmethylether to a 1 liter, three-necked, roundbottomed flask. The flask is equipped with an overhead mechanical stirrer, an addition funnel, and a condenser connected to a caustic scrubber. The flask contents are then agitated for 30 minutes while the copolymer beads are allowed to swell. Thereafter, a 30 gram portion of ferric chloride, a Friedel-Crafts catalyst, is added to the flask. The flask contents are heated to a temperature of 50° C. which is maintained for about 3 hours. After allowing the flask contents to cool, the reaction is quenched with 500 milliliters (ml) of methanol. The resulting chloromethylated copolymer beads are recovered from the flask and washed a final time with methanol.

The chloromethylated copolymer beads are partially aminated with an aminopyridine compound. A 500 ml, three-necked, round-bottom flask equipped with an overhead mechanical stirrer, a thermowell, and a water-cooled condenser is charged with 63 grams (0.30 equivalents) of the chloromethylated beads, 29 grams (0.15 equivalents) of N-(2-hydroxypropyl)-2-picolylamine which is obtained from the Rilley Tar & Chemical Company, 12 grams (0.15 equivalents) of an aqueous 50 percent sodium hydroxide solution, 114 grams of sodium chloride and 300 milliliters of water. The flask contents are thereafter heated to 85° C. and maintained at this temperature with agitation for three hours. At this point, the liquid in the flask exhibits a faint yellow tint and has a neutral pH. The flask contents are allowed to cool and the partially aminated resin beads are recovered from the liquid. After the above partial amination, 48 percent of available chloromethyl sites are reacted.

Prior to contacting the partially aminated resin beads with a tertiary amine, the beads are treated with 300 ml of an aqueous 5 percent solution of hydrochloric acid for 10 minutes. Treatment with dilute acid expands the copolymer structure and promotes removal of residual amounts of reactants from the bead. The beads are removed from the dilute acid solution and treated with an excess amount of an aqueous 4 percent solution of sodium hydroxide for 30 minutes. The beads are then washed to yield 174 ml of partially aminated resin beads exhibiting a water retention capacity of 36 percent and a wet volume capacity of 0.74 meq/ml.

Amination is substantially completed by reacting remaining chloromethyl groups with trimethylamine. A 68 ml portion of the partially aminated resin beads is placed with 120 ml of an aqueous 24 percent trimethylamine solution in a 500 ml Erlenmeyer flask. The flask contents are swirled and allowed to stand at ambient temperature, i.e., approximately 23° C., for 10 hours. The beads are filtered from the liquid and washed with 200 ml of an aqueous five percent solution of hydrochloric acid for 20 minutes and then 500 ml of a 1N aqueous sodium hydroxide solution for 20 minutes. Thereafter, the beads are washed with water to remove residual traces of salts. The resulting chelate-exchange resin beads exhibit a water retention capacity of 46 percent and a wet volume capacity of 0.98 meq/ml. The beads have a core of strong-base, quaternary ammonium functional groups represented by:

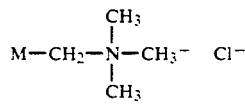

and an outer shell of weak base functional groups represented by:

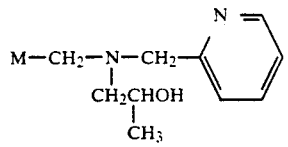

wherein M, in both formulas, represents the copolymer bead matrix.

The resin exchange kinetics are demonstrated by removal of copper ions from an acidified, aqueous solution having about 6 g/l of copper dissolved therein. The copper solution is prepared by dissolving 23.5 grams of copper sulfate pentahydrate in 100 ml of deionized water and thereafter adding a sufficient amount of deionized water to make up a volume of 900 ml. The solution is then adjusted to a pH of 2 by adding a sufficient amount of a 1.0N aqueous hydrochloric acid solution and then the solution is finally diluted with water to 1 liter in volume. An 8 ml portion of the chelate-exchange resin beads, as previously described, is placed in a flask with 200 ml of the copper solution. The flask contents are magnetically stirred at ambient temperature, i.e., about 23° C.

A two ml sample of the copper solution is taken periodically from the flask, generally once about every 5–10 minutes, and analyzed by visual light spectrophotometry to determine the amount of copper being removed by the resin beads. A one ml aliquot of each sample is diluted with three ml of an aqueous 28 percent ammonium hydroxide solution. After dilution, the absorbance at 610 NM is measured using a one centimeter flow-through cell in a Perkin-Elmer Lambda 4B UV/VIS spectrometer. Conversion ("X") is calculated by:

$$X = \frac{A_o - A_t}{A_o - A_{eq}}$$

where:
$A_o$ is absorbance at time t=0;
$A_t$ is absorbance at time t=t; and
$A_{eq}$ is absorbance at time t=24 hours.
Copper retention reaches an equilibrium level well in advance of 24 hours and, therefore, the solution is sampled and analyzed at a time of 24 hours to obtain an absorbance reading representing the equilibrium capacity for the resin.

The results are illustrated by FIG. 1 which is a graph of conversion versus time. The circles indicate data points for Example 1. The time necessary to reach one-half of the equilibrium capacity ("$T_{\frac{1}{2}}$") is determined to be 5.6 minutes.

COMPARATIVE EXAMPLE A

This example concerns preparation of a chelate-exchange resin which is substantially completely functionalized with N-(2-hydroxypropyl)-2-picolylamine. The procedure followed is substantially similar to that employed for Example 1, except as specified hereinafter.

A 250 ml, three-necked, round-bottom flask is charged with 32.3 grams (0.15 equivalents) of the chloromethylated copolymer beads of Example 1, 32.5 grams (0.18 equivalents) of N-(2-hydroxypropyl)-2- picolylamine, 13 grams (0.16 equivalents) of an aqueous 50 percent sodium hydroxide solution, 57 grams of sodium chloride, and 150 ml of water. The flask is equipped with an overhead mechanical stirrer, a thermowell, and a water-cooled condenser. The flask contents are stirred and heated to a temperature of 85° C. for 3 hours. All remaining procedures are substantially similar to Example 1. The resin has a water retention capacity of 34.5 percent in the free-base form and a wet volume capacity of 1.045 meq/ml.

The exchange kinetics for the resin are determined as in Example 1 and the data is shown in FIG. 1 for comparison therewith. The squares identify data points for Comparative Example A. The resin beads exhibit a $T_{\frac{1}{2}}$ of 16.1 minutes. Comparison of this $T_{\frac{1}{2}}$ value with the result from Example 1 indicates that exchange equilibrium occurs more slowly when the resin is substantially completely functionalized with weak-base exchange moieties, as evidenced by the significantly larger $T_{\frac{1}{2}}$ value. Thus, the data of Example 1 indicates improved exchange kinetics due to a quicker approach toward exchange equilibrium with respect to copper removal.

EXAMPLE 2

The procedure of Example 1 is repeated using bis-(2-picolyl)amine to functionalize the chloromethylated copolymer beads. The procedures employed are substantially similar to Example 1, except as indicated otherwise hereinafter.

A 1 liter round-bottom flask is initially charged with 252 grams (1.2 equivalents) of the chloromethylated beads, 120 grams (0.6 equivalents) of bis-(2-picolyl)amine purchased from the Rilley Tar & Chemical Company, 120 grams (0.6 equivalents) of the aqueous 50 percent sodium hydroxide solution, and 500 ml of a saturated 26 weight percent sodium chloride solution. The flask contents are heated to 85° C. and maintained at this temperature with agitation for three hours to partially aminate the beads. After partial amination, 49 percent of available chloromethyl sites are reacted.

A 70 ml portion of the partially aminated beads is then placed with 120 ml of the aqueous 24 percent trimethylamine solution in a 500 ml Erlenmeyer flask. The flask contents are swirled and allowed to stand at ambient temperature, i.e., approximately 23° C., for 10 hours. The resulting chelate-exchange resin beads exhibit a water retention capacity of 46 percent and have a wet volume capacity of 1.05 meq/ml. The beads have a core of strong-base, quaternary ammonium functional groups represented by:

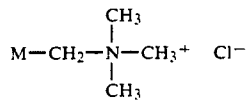

and an outer shell of weak-base functional groups represented by:

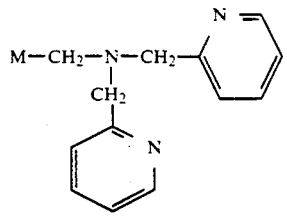

wherein M, in both formulas, represents the copolymer bead matrix.

Figure 2:
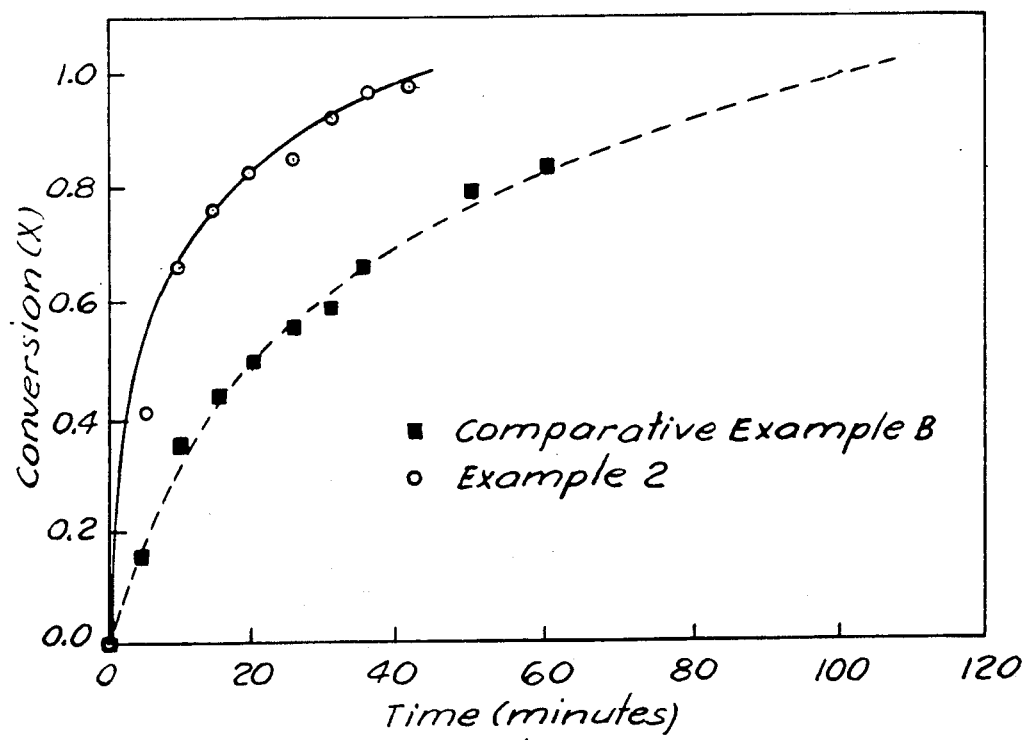
FIG. 2 is a graph of conversion versus time for results discussed in connection with Example 2 and Comparative Example B.

The exchange kinetics for the resin are determined as in Example 1. The results are illustrated graphically by FIG. 2. The circles identify data points for Example 2. The resin beads exhibit a $T_{\frac{1}{2}}$ of 6.6 minutes.

COMPARATIVE EXAMPLE B

Example 2 is repeated, except that the chloromethylated copolymer beads are substantially completely functionalized with bis-(2-picolyl)amine. The procedure followed is substantially similar to Example 2, except as indicated otherwise hereinafter.

The flask is initially charged with 39 grams (0.187 equivalents) of the chloromethylated copolymer beads, 40 grams (0.2 equivalents) of bis-(2-picolyl)amine, 18.8 grams (0.235 equivalents) of the aqueous 50 percent sodium hydroxide solution, and 170 ml of the saturated sodium chloride solution. All other procedures are substantially the same as in Example 2. The resin has a water retention capacity of 39 percent and wet volume capacity of 1.11 meq/ml. The exchange kinetics are determined as in Example 2 and the results are graphed on FIG. 2 for comparison therewith. The squares indicate data points for Comparative Example B. The resin beads exhibit a $T_{\frac{1}{2}}$ of 10.1 minutes, thereby indicating decreased exchange kinetics when compared to the smaller $T_{\frac{1}{2}}$ associated with the resins of Example 2.

EXAMPLE 3

The procedure of Example 1 is substantially repeated, except that the chloromethylated copolymer beads are partially aminated with N-(2-hydroxypropyl)-2-picolylamine to a greater extent prior to amination with trimethylamine. The procedure followed is substantially similar, except as indicated otherwise hereinafter.

The flask is initially charged with 47.4 grams (0.22 equivalents) of the chloromethylated beads, 41 grams (0.247 equivalents) of N-(2-hydroxypropyl)-2-picolylamine, 25 grams (0.315 equivalents) of the sodium hydroxide solution, and 500 ml of a saturated 26 weight percent sodium chloride solution. After partial amination as in Example 1, 87 percent of available chloromethyl sites are reacted.

Figure 3:
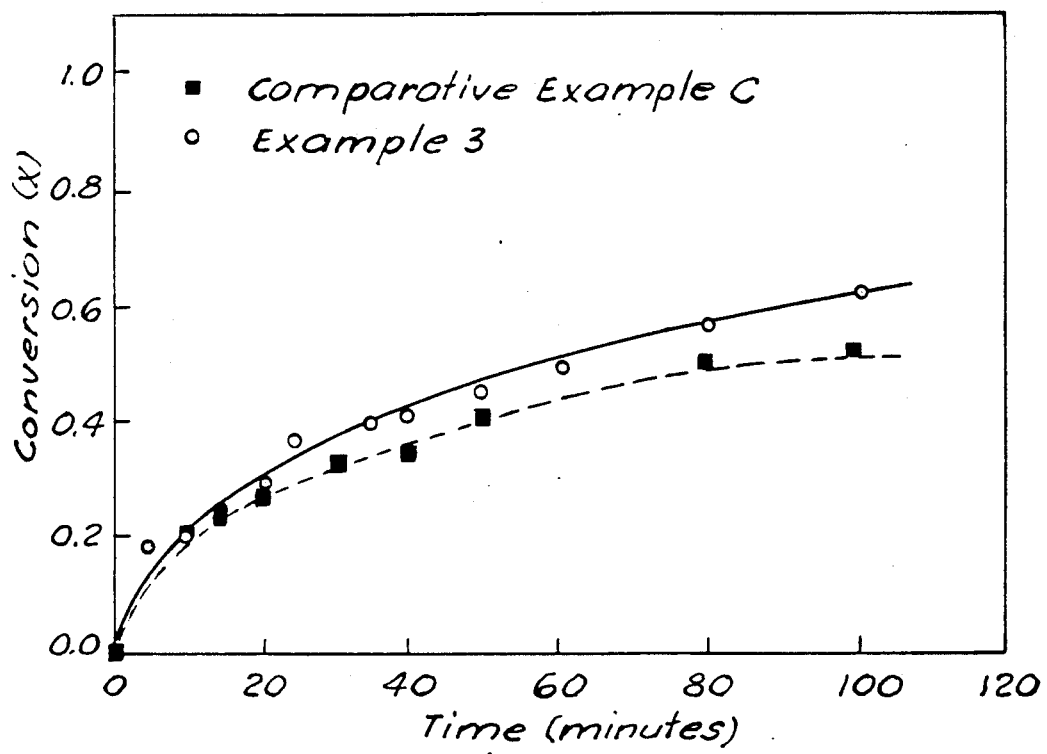
FIG. 3 is a graph of conversion versus time for results discussed in connection with Example 3 and Comparative Example C.

Thereafter, a 70 ml portion of the partially aminated beads is placed with 120 ml of the aqueous 24 percent trimethylamine solution in a 500 ml Erlenmeyer flask. The flask contents are swirled and allowed to stand at ambient temperature, i.e., approximately 23° C., for 10 hours. All other procedures are substantially similar to those of Example 1. The resin has a water retention capacity of 36 percent and a wet volume capacity of 0.98 meq/ml. The exchange kinetics are determined as in Example 1 and the results are graphed in FIG. 3. The circles indicate data points for Example 3. The resin beads exhibit a $T_{\frac{1}{2}}$ of 53.2 minutes.

COMPARATIVE EXAMPLE C

The procedure of Example 3 is substantially repeated, except that the partially aminated resin beads are not aminated with the trimethylamine solution. The resin has a water retention capacity of 28 percent and a wet volume capacity of 0.99 meq/ml. The exchange kinetics are determined as in Example 1. The results are graphed in FIG. 3 for comparison therewith. The resin beads exhibit a $T_{\frac{1}{2}}$ of 83.1 minutes, thereby indicating that exchange kinetics are substantially improved, as previously described in the foregoing examples, through formation of hydrophilic, strong-base exchange moieties at chloromethylated sites which are least accessible to diffusion.

What is claimed is:

1. A process for preparing resin beads which comprise cross-linked copolymer beads having weak-base exchange moieties substituted at haloalkylated sites which are most accessible to diffusion and hydrophilic, strong-base exchange moieties substituted at haloalkylated sites which are least accessible to diffusion, the process comprising the steps of:
   (a) contacting the haloalkylated, cross-linked copolymer beads with a first aminating agent under conditions and in an amount sufficient to substitute at least a portion of the haloalkylated sites with the weak-base exchange moieties and obtain partially functionalized copolymer beads, the substitution being conducted at a reaction rate which is greater than the rate at which the first aminating agent diffuses into the copolymer beads; and
   (b) contacting the partially functionalized copolymer beads with a tertiary amine under conditions and in an amount sufficient to functionalize at least a portion of remaining haloalkylated sites with the strong-base exchange moieties.

2. The process of claim 1 wherein the first aminating agent corresponds to the formula:

$HNR^1R^2$ wherein:
   $R^1$ is hydrogen, an aliphatic group having up to about 16 carbon atoms, or an aromatic group having up to about 16 carbon atoms; and
   $R^2$ is an aliphatic group having up to about 16 carbon atoms or an aromatic group having up to about 16 carbon atoms.

3. The process of claim 1 wherein the first aminating agent is dimethylamine, diethylamine, dipropylamine, dibutylamine, methylamine, ethylamine, propylamine, butylamine, benzylamine, methylbenzylamine, N,N-dibenzylamine, aniline, methylaniline, or an aminopyridine.

4. The resin of claim 1 wherein the first aminating agent is 2-picolylamine, N-methyl-2-picolylamine, N-(2-hydroxyethyl)-2-picolylamine, N-(2-hydroxypropyl)-2-picolylamine, or bis-(2-picolyl)amine.

5. The process of claim 14 wherein the cross-linked copolymer beads are chloromethylated.

6. The process of claim 1 wherein step (b) further comprises functionalizing substantially all remaining haloalkylated sites with the strong-base exchange moieties.

7. The process of claim 1 wherein the copolymer beads are macroporous.

8. The process of claim 1 wherein the copolymer beads are of a gel copolymer.

9. The process of claim 1 wherein the copolymer beads comprise from about 50 to about 99.9 weight percent of a monovinyl aromatic monomer and from about 0.1 to about 50 weight percent of a cross-linking monomer based on the weight of the monomers.

10. The process of claim 9 wherein the monovinyl aromatic monomer is styrene.

11. The process of claim 9 wherein the cross-linking monomer is divinylbenzene.

12. The process of claim 1 wherein from about 15 to about 95 percent of the haloalkylated sites are substituted with the weak-base exchange moieties.

13. The process of claim 1 wherein step (a) further comprises contacting the haloalkylated cross-linked copolymer beads with the first aminating agent in a liquid medium, the liquid medium being substantially incapable of swelling the cross-linked copolymer beads, but miscible with the first aminating agent.

14. The process of claim 13 wherein the liquid medium is water, a $C_{1-4}$ alcohol, or mixtures thereof.

15. The process of claim 13 wherein the liquid medium is water.

16. The process of claim 15 wherein the liquid medium comprises at least one soluble salt selected from alkali metal halides and alkali metal sulfates.

17. The process of claim 16 wherein the soluble salt is sodium chloride.

18. The process of claim 16 wherein the soluble salt is present in an amount of from about 100 g/l up to saturation for the soluble salt in water.

19. The process of claim 1 wherein the tertiary amine is trimethylamine, triethylamine, tripropylamine, tributylamine, dimethylethylamine, dimethylisopropanolamine, ethylmethylpropylamine, dimethylaminoethanol, dimethylethanolamine, or diethylmethylamine.

20. The process of claim 1 wherein the tertiary amine is trimethylamine.

* * * * *

UNITED STATES PATENT AND TRADEMARK OFFICE
CERTIFICATE OF CORRECTION

PATENT NO.   : 5,141,965
DATED        : August 25, 1992
INVENTOR(S)  : William C. Pike It is certified that error appears in the above-identified patent and that said Letters Patent is hereby corrected as shown below:

Column 15, line 47, "atoms:" should read --atoms;--.
Column 16, line 7, "14" should read --1--.

Signed and Sealed this

Thirtieth Day of November, 1993

Attest:

BRUCE LEHMAN

Attesting Officer

Commissioner of Patents and Trademarks